United States Patent
Appleford et al.

(10) Patent No.: US 6,626,470 B1
(45) Date of Patent: Sep. 30, 2003

(54) TWO-PART CONNECTOR FOR FLUID CARRYING CONDUITS

(75) Inventors: David Eric Appleford, Epping (GB); Brian William Lane, Canvey Island (GB); Ian Ronald Sutton Watson, Gravesend (GB)

(73) Assignee: Alpha Thames Ltd., Essex (GB)

( * ) Notice: Subject to any disclaimer, the term of this patent is extended or adjusted under 35 U.S.C. 154(b) by 0 days.

(21) Appl. No.: 10/129,631

(22) PCT Filed: Nov. 16, 2000

(86) PCT No.: PCT/GB00/04360

§ 371 (c)(1),
(2), (4) Date: May 7, 2002

(87) PCT Pub. No.: WO01/36785

PCT Pub. Date: May 25, 2001

(30) Foreign Application Priority Data

Nov. 16, 1999 (GB) ............................................. 9927137

(51) Int. Cl.⁷ ................................................. F16L 39/00
(52) U.S. Cl. ........................................ 285/320; 285/920
(58) Field of Search ................................ 285/920, 320, 285/124.1, 124.5, 311, 309

(56) References Cited

U.S. PATENT DOCUMENTS

| | | | | |
|---|---|---|---|---|
| 3,661,408 A | * | 5/1972 | Gibbons | 285/18 |
| 3,675,713 A | * | 7/1972 | Watkins | 166/340 |
| 4,169,507 A | * | 10/1979 | Szymczak | 166/340 |
| 4,183,189 A | * | 1/1980 | Keller et al. | 52/637 |
| 4,477,105 A | * | 10/1984 | Wittman et al. | 285/18 |
| 4,516,795 A | * | 5/1985 | Baugh | 285/315 |
| 4,693,497 A | * | 9/1987 | Pettus et al. | 285/12 |
| 4,708,376 A | * | 11/1987 | Jennings et al. | 285/315 |
| 4,902,044 A | * | 2/1990 | Williams et al. | 285/18 |
| 5,060,989 A | * | 10/1991 | Gallucci et al. | 285/337 |
| 5,114,117 A | * | 5/1992 | Appleford et al. | 251/149.9 |
| 5,433,411 A | * | 7/1995 | Appleford et al. | 251/148 |
| 5,560,258 A | | 10/1996 | Coffey et al. | |

FOREIGN PATENT DOCUMENTS

GB        2 261 271 A       5/1993

* cited by examiner

Primary Examiner—Eric K. Nicholson
(74) Attorney, Agent, or Firm—Summa & Allan, P.A.

(57) ABSTRACT

A two-part connector (1) is provided for use in connecting and disconnecting fluid carrying conduits. The connector comprises lower and upper parts (2, 3) each having four fluid carrying duct (15) therethrough, and a valve member (17) for each duct. Each duct in the lower part (2) is aligned with its respective duct in the upper part (3) when the two connector parts are connected together. The connector has clamps (24) for retaining the lower and upper parts (2, 3) together in sealing engagement. The clamps are mounted on the upper connector part (3) and are pivotable thereabout. Hydraulic pistons are used to move the clamps, the clamps being located in a first position pivoted away from the connector whilst the lower and upper parts (2, 3) are being aligned relative to each other. The pistons are operable to pivot the clamps to a second position adjacent the connector and then to cause the clamps to move to a third position so as to engage the lower part (2) so that the two parts are clamped together in sealing engagement.

14 Claims, 11 Drawing Sheets

TWO-PART CONNECTOR FOR FLUID CARRYING CONDUITS

BACKGROUND OF THE INVENTION

The present invention relates to a connector for use in connecting and disconnecting fluid carrying conduits. The connector is particularly suitable for use in subsea locations where it is necessary to connect and disconnect oil and/or gas carrying conduits to and from subsea production modules and pipelines although this subsea use of the connector is preferred rather than essential as the connector can equally well be used in a land or a platform based application.

A known connector for use in connecting and disconnecting fluid carrying conduits is described in GB-A-2261271. This connector is a two-part connector comprising an upper part and a lower part each having a plurality of fluid carrying bores therethrough. Each bore has a valve member which either permits or prevents flow through the bore. The upper part is lowered onto the lower part and is then rotated relative to the lower part so that the bores of the two parts are aligned. The connector also has clamping means that include a plurality of elongate tensioning members which are axially extended and locked in their extended position in order to clamp the upper and the lower parts together. This connector requires three separate sets of hydraulics for respectively lowering the upper part into position, turning the upper part in relation to the lower part and stretching the bars. Each set of hydraulics comprises a complex arrangement of components including valves, seals and stab connectors. Thus, having several sets of hydraulics may require at least part of the hydraulics to be often repaired thus affecting the operation of the underwater system that the two-part connector is a part of.

SUMMARY OF THE INVENTION

It is an object of the present invention to overcome at least one or more of the disadvantages associated with such prior art connectors.

According to the present invention there is provided a two-part connector for use in connecting and disconnecting fluid carrying conduits comprising first and second connector parts each having at least one fluid carrying duct therethrough, and a valve member for each duct, the or each duct in the first connector part being aligned with the or each duct in the second connector part when the two connector parts are connected together, and releasable clamping means to retain the two connector parts together in sealing engagement, said clamping means being mounted on the second connector part and including actuating means, characterised by said clamping means including a plurality of clamping members pivotable relative to the connector and the actuating means operable to move said clamping members, said clamping members being located in a first position pivoted away from said connector whilst the two connector parts are being aligned relative to each other, and said actuating means being operable to pivot said clamping members to a second position adjacent said connector and then to cause the clamping members to move to a third position so as to engage the first connector part so that the two parts are clamped together in sealing engagement.

In one embodiment, each clamping member comprises first and second components joined together by at least one elongate member, the first component being pivotally connected to the second connector part and the second component being adapted to engage the first connector part so as to clamp the connector parts together.

Each elongate member may comprise a tie bar adapted to effect the clamping action by over-centering of a toggle joint mechanism when the clamping members are in the third position.

Preferably, the actuating means is hydraulically operated. The actuating means may comprise a plurality of piston cylinders in which at least one piston cylinder, by extending or retracting a piston rod, causes at least one clamping member to be moved between the first, second and third positions.

The first component may comprise the toggle joint mechanism. The toggle joint mechanism may include at least one first arm member pivotally connected to the second connector part and to the actuating means and at least one second arm member pivotally connected to the actuating means and to the elongate member. The first component may include engagement means pivotally connected to the actuating means and to the second connector part, the engagement means adapted to engage the second connector part to prevent pivoting of the clamping member when the clamping member is moved between said second and third positions. The first arm member may include an engagement surface which engages the second connector part so as to prevent pivoting of the first arm member relative to the second connector part when the clamping member pivots between said first and second positions and which disengages from the second connector part so as to enable pivoting of the first arm member relative to the second connector part when the clamping member moves between said second and third positions.

The first and second connector parts of the connector may each have a mating surface and the connector may include at least one jacking pin which the actuating means is adapted to act on, the actuating means enabling the or each jacking pin to be extended or retracted through the mating surface from one of said connector parts and the pins being adapted to make contact with the mating surface of the other of said connector parts.

Preferably the connector includes alignment means for aligning the first and second connector parts as they engage each other.

The connector may include a plurality of location pins, each pin extending from the mating surface from one of said connector parts and being adapted to be received in a receiving hole in the mating surface of the other of said connector parts. Alternatively, the connector may include a plurality of protrusions, each protrusion extending from a corner of the mating surface from one of said connector parts and being adapted to be received in a recessed corner of the mating surface of the other of said connector parts. Where the mating surfaces of the connector parts are rectangular, at least one pair of opposite corners of the mating surfaces has said protusions and recessed corners.

Only one set of hydraulics is required to operate the two-part connector and so significantly reduce the frequency of the hydraulics being repaired. The hydraulically operated arrangement is lighter and more compact than known hydraulically operated two-part connectors.

BRIEF DESCRIPTION OF THE DRAWINGS

In order that the present invention may be more readily understood, reference will now be made, by way of example, with reference to the accompanying drawings, in which:

FIGS. 9 to 16 are schematic views of the installation and clamping of the upper part of the two-part connector to the lower part of the two-part connector, wherein FIGS. 10, 12, 14 and 16 are details of FIGS. 9, 11, 13 and 15 respectively.

DETAILED DESCRIPTION OF THE PREFERRED EMBODIMENT

Figure 1:
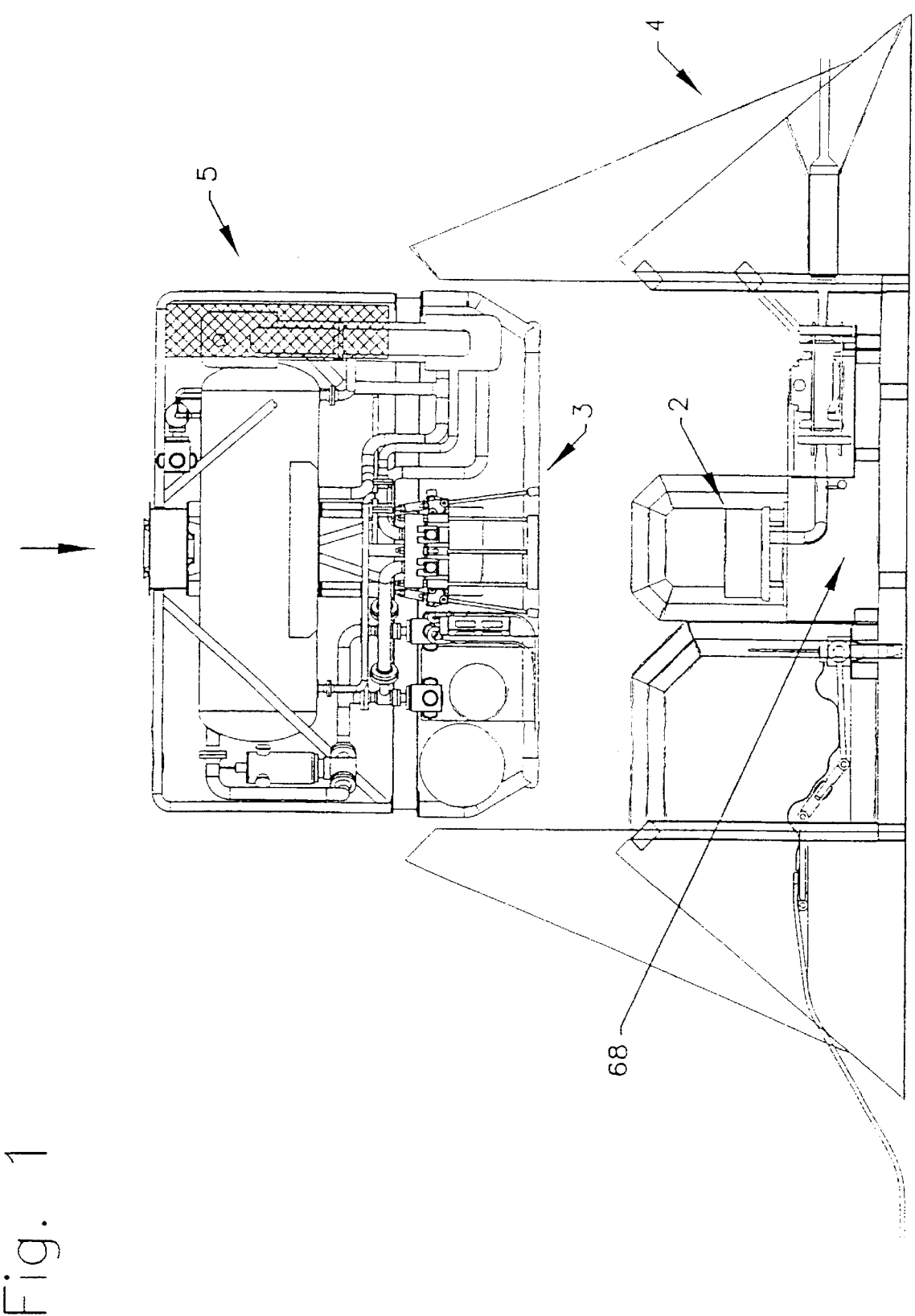
FIG. 1 is an elevational view of part of a subsea system including a two-part connector according to an embodiment of the invention.

Referring to FIG. 1 of the accompanying drawings, the two-part connector for use in connecting and disconnecting fluid carrying conduits comprises a lower part 2 and an upper part 3. The lower part 2 is shown as part of a docking unit 68 which is locked onto a support frame 4 which is essentially of a structual framework construction and is secured to the seabed. The upper part 3 is shown as part of a retrievable substantially autonomous module 5 which is shown being lowered into the frame 4.

Figure 2:
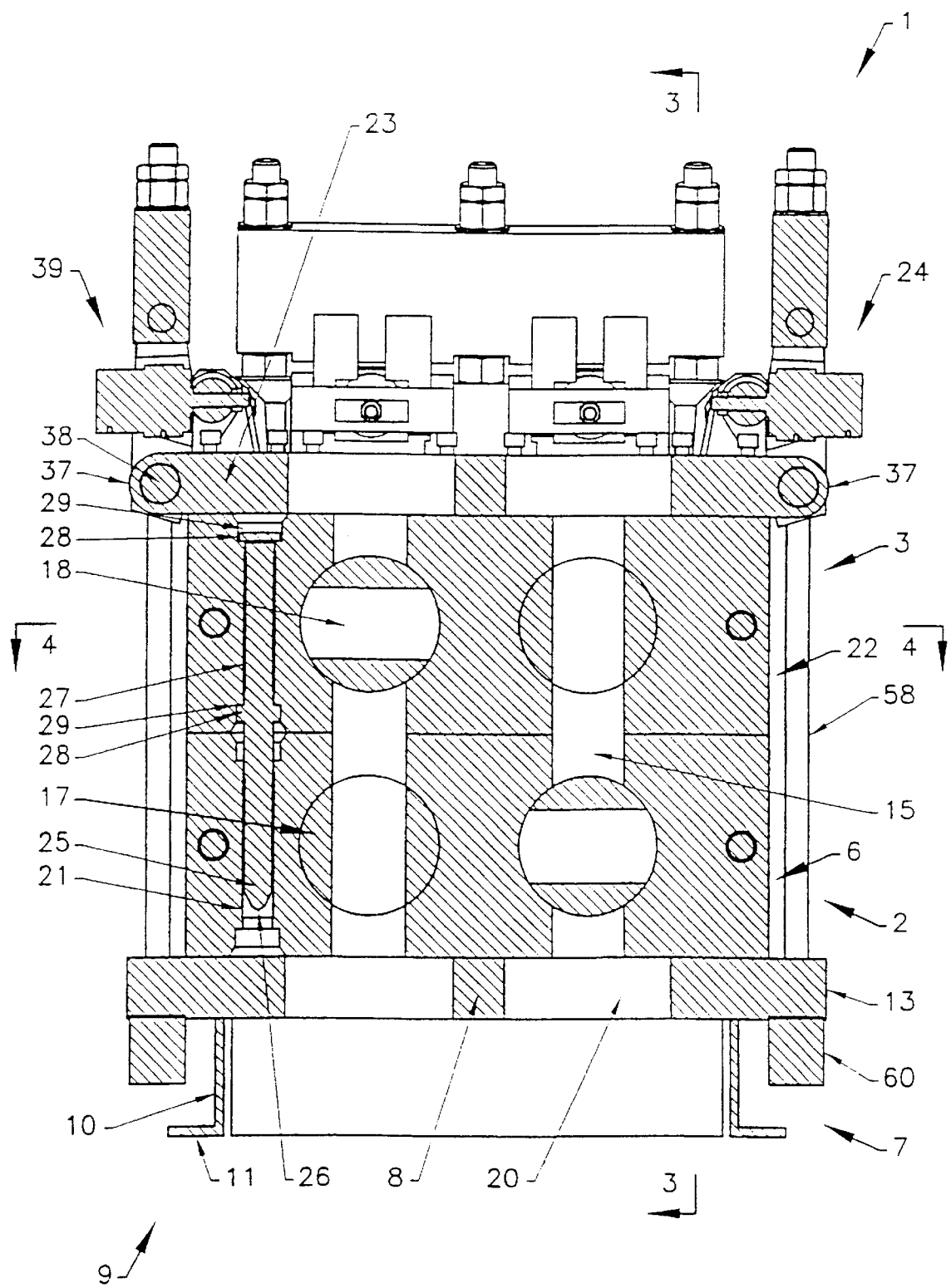
FIG. 2 is a sectional view of the two-part connector.
Figure 3:
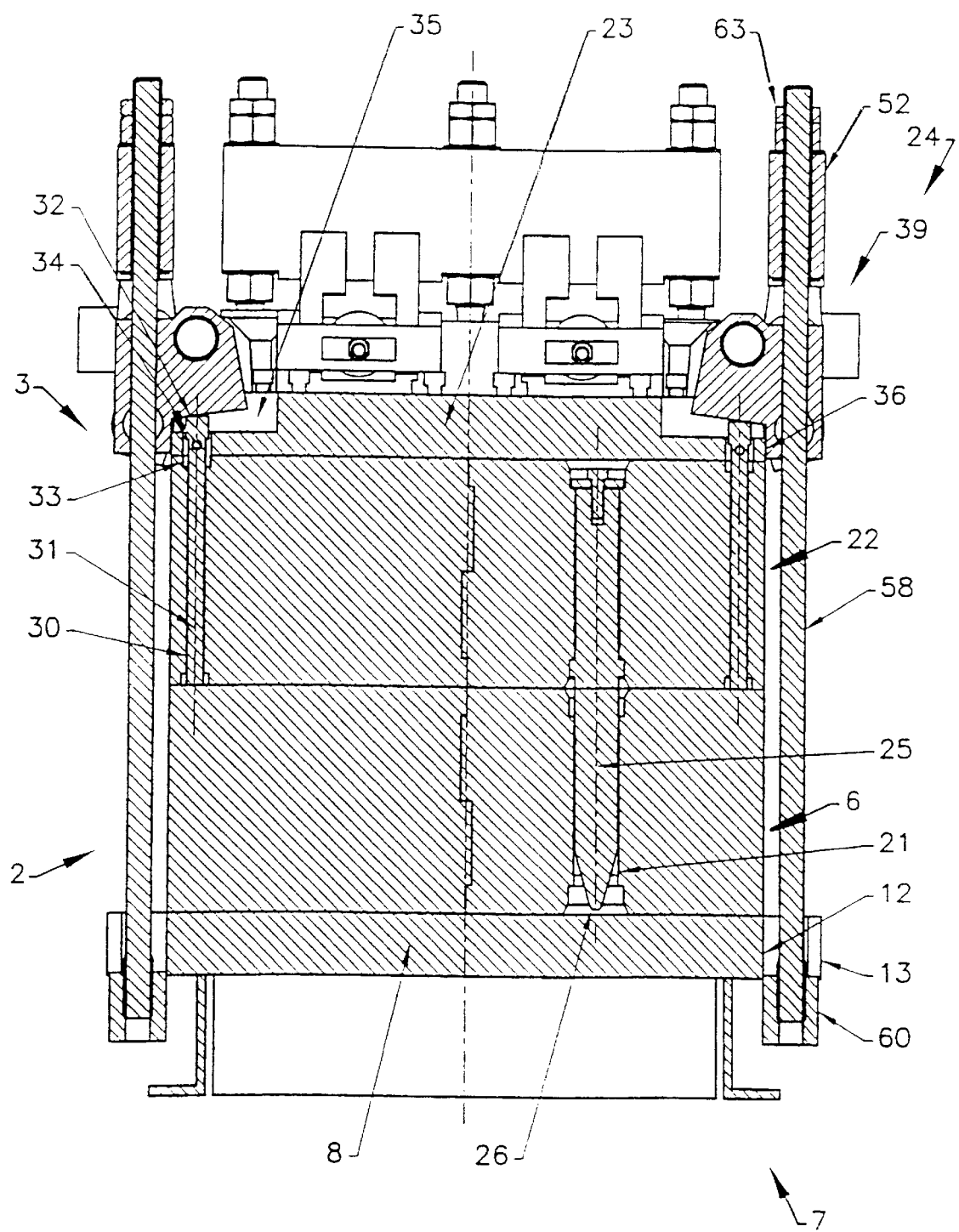
FIGS. 3 and 4 are sectional views taken along lines 3—3 and lines 4—4 respectively of FIG. 2.
Figure 4:
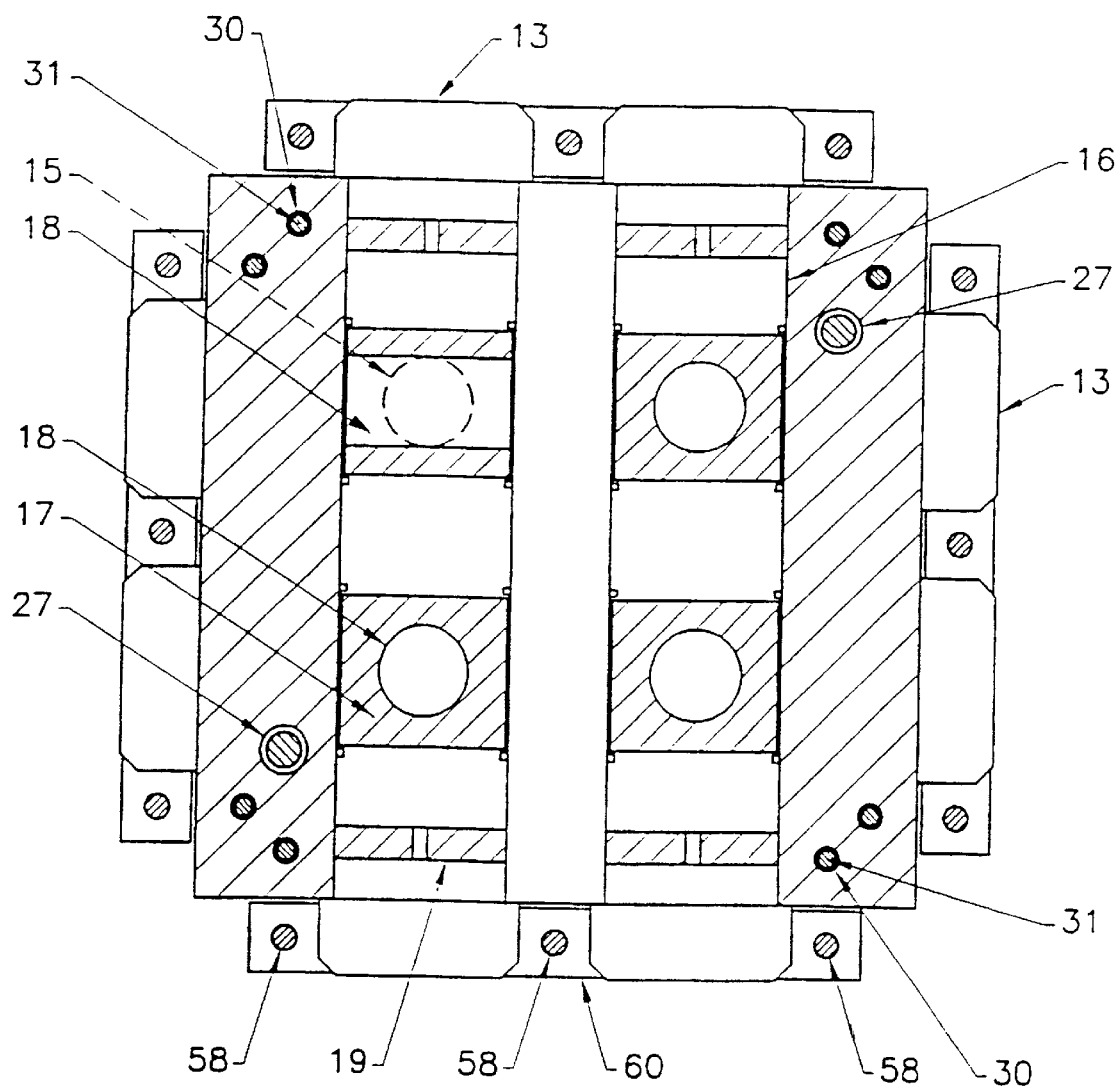

Referring to FIGS. 2 to 4, the lower part 2 of the connector 1 comprises a lower manifold block 6, which is square in plan, and which is connected to a pedestal 7 via a plate 8. The pedestal 7 comprises four L-shaped members 9, one for each side of the block 6. The top of the upstanding part 10 of each L-shaped member is integrally attached to the base of the plate 8 and the outward projecting feet 11 of the L-shaped members are attached to the support frame 4 (see FIG. 1). Each side 12 of the plate 8 has a pair of tongues 13 which project beyond the manifold block 6 and the upstanding parts 10 of the L-shaped members.

The lower manifold block 6 has four main bores or ducts 15 which extend vertically through the manifold block, the ducts forming the corners of a square in plan. Each pair of main ducts 15 is intersected by a cross bore 16 which extends horizontally through the manifold block and has seals 19 at opposite ends. At each intersection of the cross bore with a main duct there is a rotatable valve member 17 in the form of a spindle extending normally through each main duct. Each spindle has a through-bore 18 which can be aligned with the main duct to permit fluid flow therethrough. Each spindle valve 17 is rotatable about its longitudinal axis to rotate its through-bores through 90° to a second position in which the body of the spindle valve obturates the duct and prevents fluid flow therethrough. Each spindle valve is adapted to be operated by a remotely operated vehicle (ROV) which accesses the spindle valve from outside the connector 1 via the appropriate cross bore 16 and the seal 19.

The base of the ducts 15 are provided with flange connections 20 in the plate 8 for connection to pipelines from wells (not shown). The lower manifold block 6 also has two additional vertical bores 21 which are each located close to opposite sides of the block and are each equal distance from the other two sides of the block.

The upper part 3 comprises an upper manifold block 22, a top plate 23 attached to the top of the upper manifold block and mating clamps 24 wherein each mating clamp is attached to one side of the top plate.

The upper manifold block 22 is similar to the lower manifold block 6 and also has four vertical ducts 15, each with a rotatable valve member 17. The vertical ducts of the upper manifold block are arranged so that they are aligned and form sealed connections with the vertical ducts of the lower manifold block when the upper part 3 is installed on the lower part 2. The upper manifold block 22 also has two location pins 25 which extend below the base of the upper manifold block. Each location pin is cylindrical in shape and has a cone end portion 26 at its base. Each location pin is held in a vertical bore 27 in the upper manifold block wherein a flange 28 at the top of the pin and part way down the pin are received by recesses 29 in the bore 27. The pins are located so that they are received by the location bores 21 in the lower manifold block 6 when the upper part 3 is installed on the lower part 2. The upper manifold block 22 also has eight more vertical through bores 30 with a pair of bores located close to each side of the block and each of these bores 30 is adapted to hold a jacking pin 31. Each jacking pin 31 is cylindrical in shape and is of slightly longer length than the depth of the upper manifold block 22. The pin has a head 32 which is of larger diameter than the rest of the pin. This head is adapted to be received into a recess 33 at the top of each bore 30 and into a hole 34 in the top plate 23 of the same diameter as the recess 33.

The top surface of the top plate 23 is recessed in each corner and each recessed corner 35 contains two of the jack head holes 34 (one hole for each side of the top plate). Extending from each side 36 of the top plate are a pair of protrusions 37 for holding a pivot pin 38 to which a toggle joint mechanism 39 of the mating clamp 24 is connected.

Figure 5:
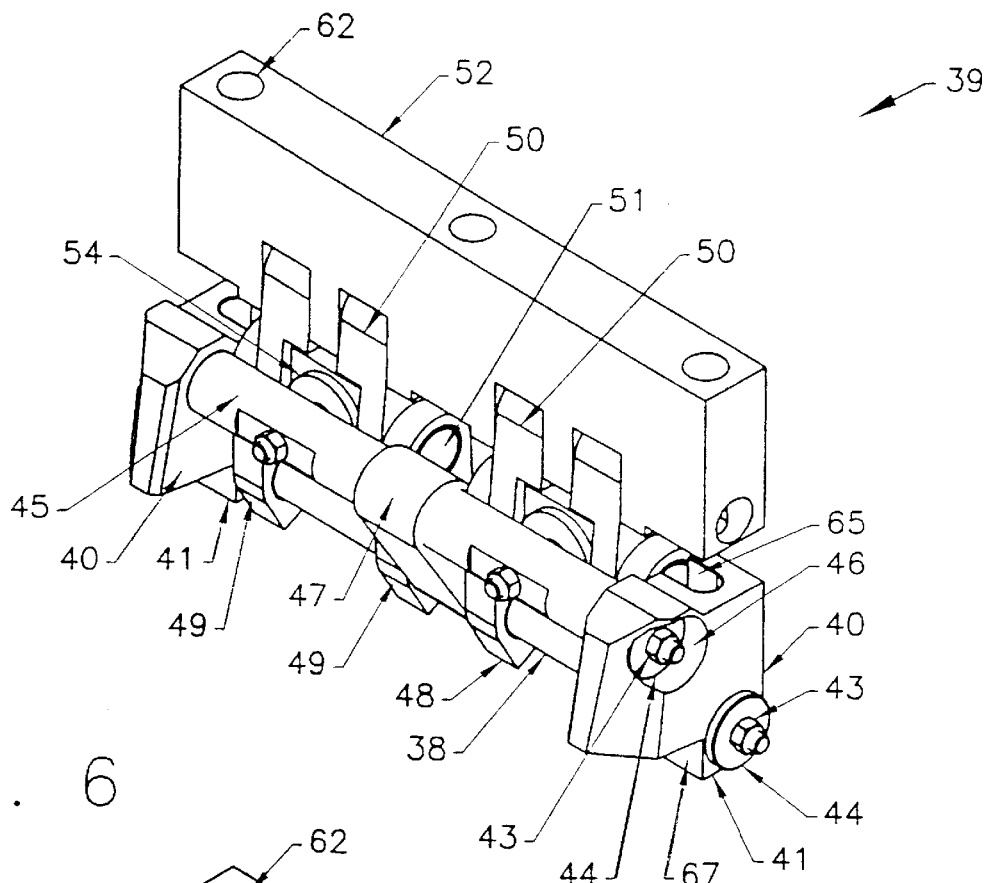
FIGS. 5 and 6 are isometric views of a toggle joint mechanism forming part of the two-part connector.
Figure 6:
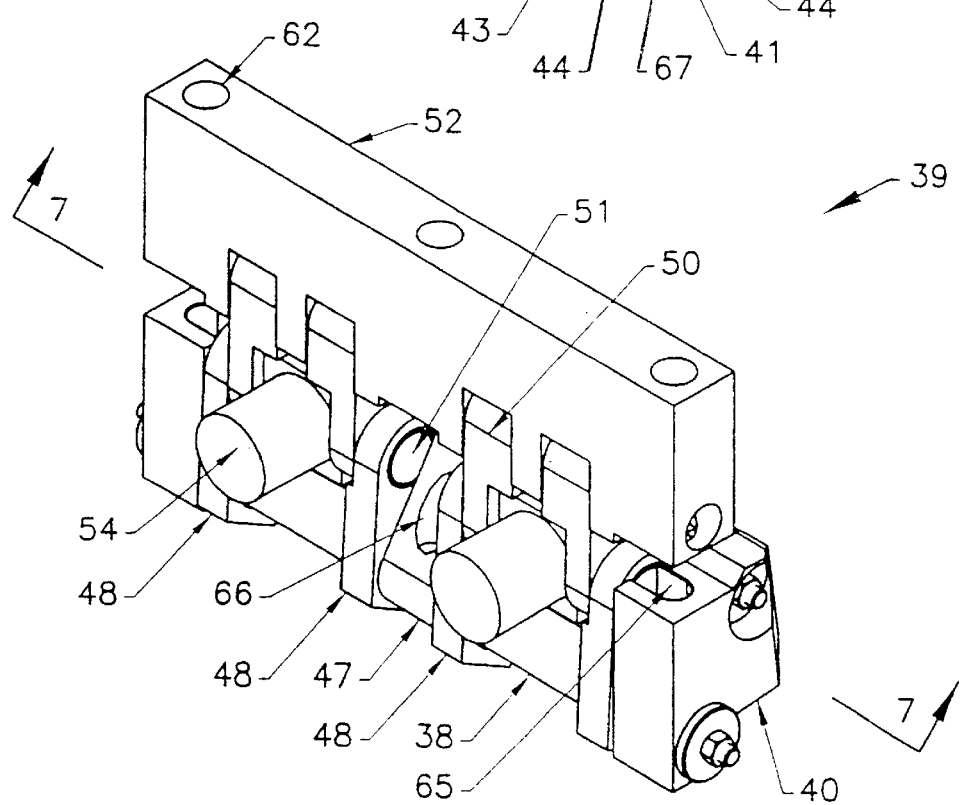
Figure 7:
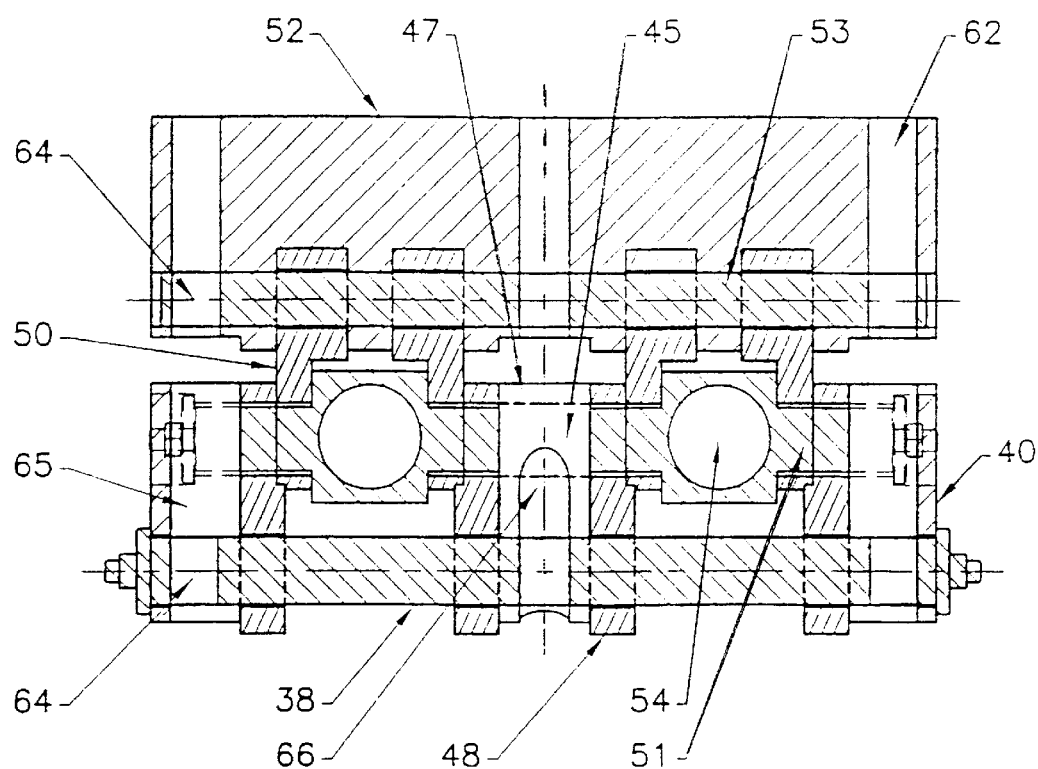
FIG. 7 is a sectional view taken along line 7—7 of FIG. 6.
Figure 8:
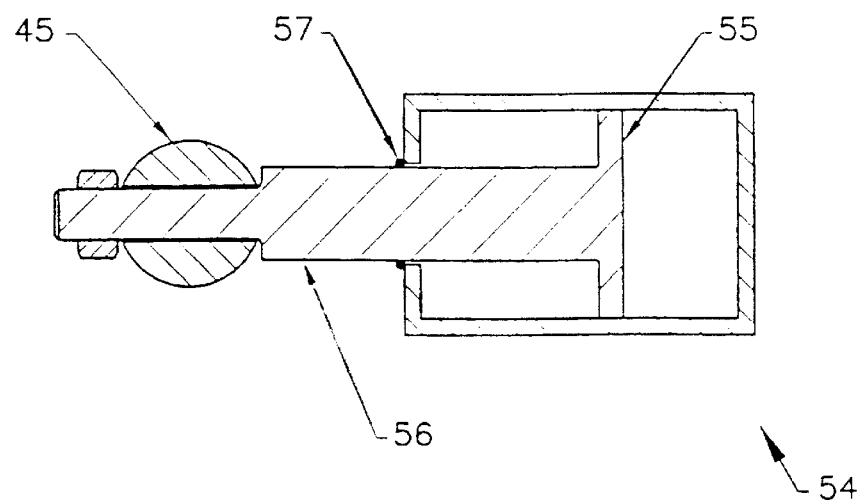
FIG. 8 is a sectional view of a piston arrangement forming part of the toggle joint mechanism.
Figure 10:
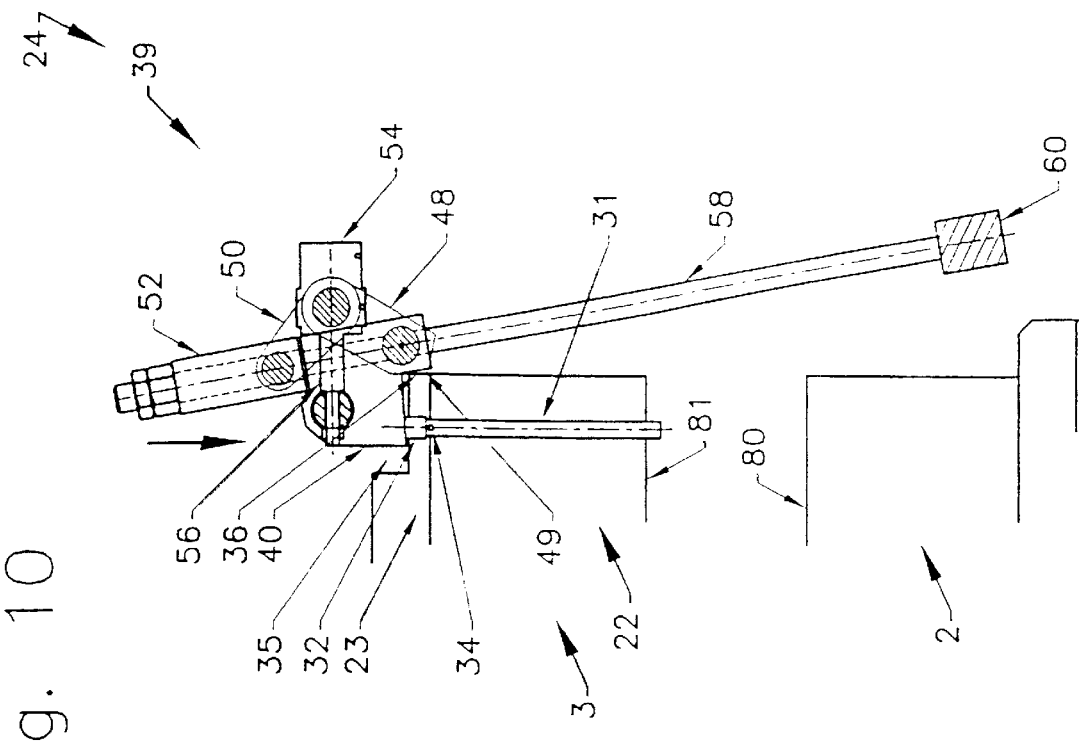
Figure 9:
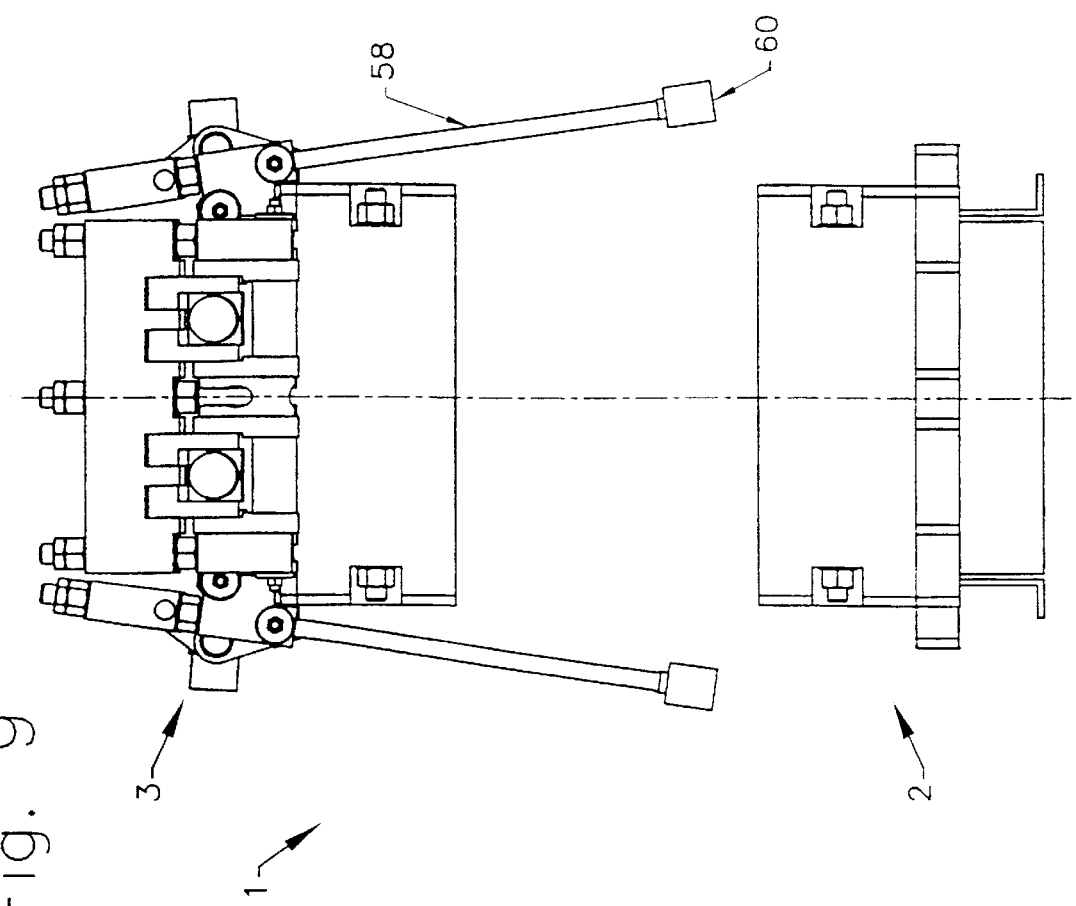

Referring to FIGS. 5 to 7, the toggle joint mechanism 39 includes a pair of end brackets 40 for holding the ends of the pivot pin 38. Each end bracket 40 has a downward protruding portion 41 extending from one corner of the main body portion of the bracket and it is these portions which hold the ends of the pivot pin 38. A nut 43 connects a retainer 44 to each end of the pivot pin 38 and to an outer side of each end bracket 40 so as to retain the brackets on the ends of the pivot pins. The end brackets 40 also hold the ends of a rod end pin 45 which is parallel to the pivot pin 38 but is located in an opposite corner of the bracket from the corner containing the end of the pivot pin. Each end bracket 40 has a recess 46 for holding a retainer 44 and a nut 43 which retain the rod end pin 45 between the brackets. A link member 47 is located midway between the end brackets 40 through which both the pivot pin 38 and the rod end pin 45 extend. Between the link member 47 and each end bracket 40 are a pair of bottom toggle arms 48 through which the pivot pin 38 extends, each toggle arm 48 having a side edge 49 or engagement surface so shaped for engaging a side edge 36 of the top plate 23 (see FIG. 3). Each pair of bottom toggle arms 48 is connected to a pair of top toggle arms 50 by trunnion bearings 51 and each pair of top toggle arms 50 is connected to a top beam 52 by a toggle pin 53. Between each pair of top toggle arms 50 is a hydraulic cylinder 54 from the sides of which protrude the trunnion bearings 51. Within the cylinder 54 is a slidably mounted piston 55 (see FIG. 8) which has a piston rod 56 extending from the piston. The piston rod 56 protrudes through a seal 57 at one end of the cylinder and then, at a narrower diameter, through the rod end pin 45 where it is bolted to the point of the rod end pin furthest away from the hydraulic cylinder. The hydraulic cylinder 54 is controlled by a pump and actuating valves (not shown) which are used to control the pumping of pressurised oil into the cylinder to drive the piston 55 in a known manner.

The mating clamp 24 has three parallel tie bars 58 (see FIGS. 2 to 4) which are elongate members. The bottom portions of the tie bars are connected together by a foot bar 60 which is parallel to one side of the blocks 6,22 and is located below the lower manifold block 6 when the two blocks are connected. The top portions of the three tie bars 58 are received by the toggle joint mechanism 39, the three tie bars extending through cylindrical holes 62 in the top beam where nuts 63 prevent the tie bars from falling away from the top beam. The three tie bars also extend through cylindrical holes 64 in the pivot pin 38 and the toggle pin 53, the pivot pin and the toggle pin both being of larger diameters than the tie bars. The two outer tie bars also extend through holes 65 in the two end brackets 40 and the middle tie bar extends through a cylindrical hole 66 in the link member 47.

Referring to FIGS. 9 to 16, the process of installing the upper part 3 of the connector 1 onto the lower part 2 in sea-water will be described. Although only the operation of one mating clamp 24 will be described, all the mating clamps will operate in the same way simultaneously. Thus, all the hydraulic cylinders 54 of all the mating clamps 24 form a single set of hydraulics.

Both the upper and the lower manifold blocks 6,22 have fluid conduits attached (not shown). The spindle valves 17 (see FIG. 2) in both the blocks 6,22 are all initially positioned so as to obturate the ducts 15 in the blocks.

Each mating clamp 24 of the upper part 3 is arranged so that the piston rod 56 is fully extended from the hydraulic cylinder 54. This causes the bottom and top toggle arms 48,50 to be at their greatest angle relative to the tie bars 58 thus causing the underside of the top beam 52 to be near or engage the top of the end brackets 40 and the side edge 49 of the bottom toggle arm 48 to be parallel to and substantially in contact with the side edge 36 of the top plate 23. This causes the tie bars 58 to be inclined in relation to the side of the upper manifold block 22 and also has the effect of the foot bar 60 being at its maximum extent from the toggle joint mechanism 39. The end brackets 40 are positioned so that the underside of the main body portion of each end bracket is in contact with the head 32 of a respective jacking pin 31 forcing the head into the hole 34 in the recessed corner 35 and causing the jacking pins to protrude through the base 81 of the upper manifold block 22.

A retrievable autonomous module 5 (see FIG. 1) including the upper part 3 is moved towards the docking module 68 of the support frame 4 including the lower part 2. The coned ends 26 (see FIG. 2) of the two location pins 25 of the upper manifold block 22 enter the corresponding location bores 21 in the lower manifold block 6. These form a secondary location device for accurately locating the upper manifold block in relation to the lower manifold block.

Figure 12:
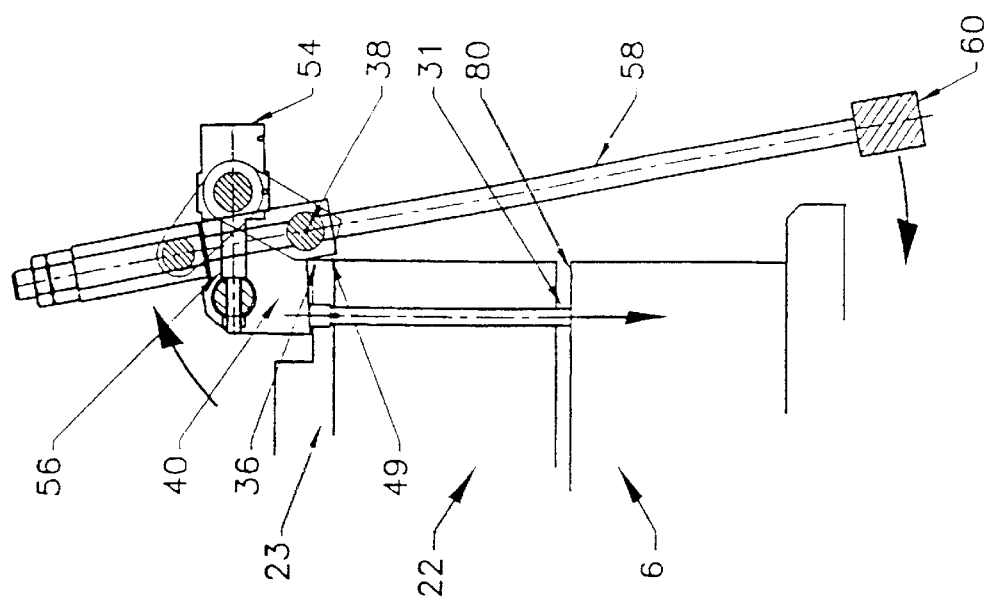
Figure 11:
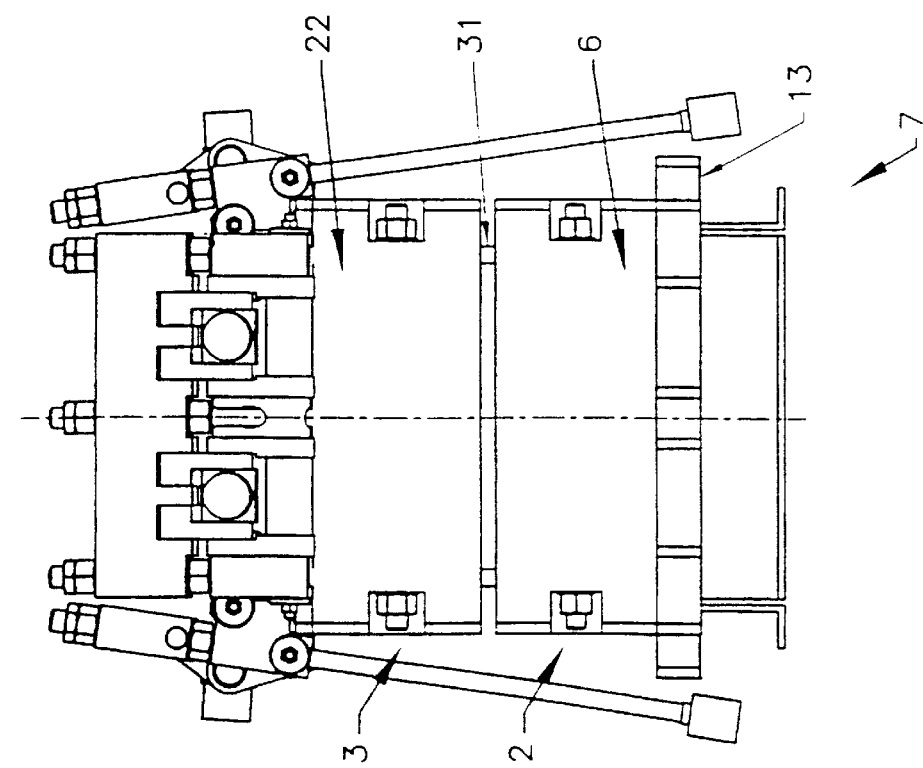
Figure 14:
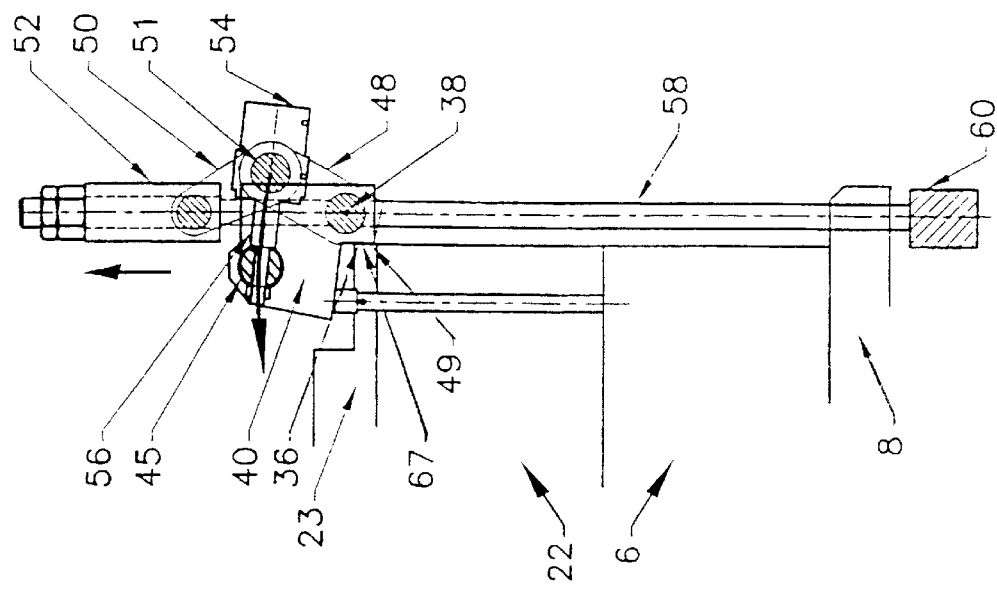
Figure 13:
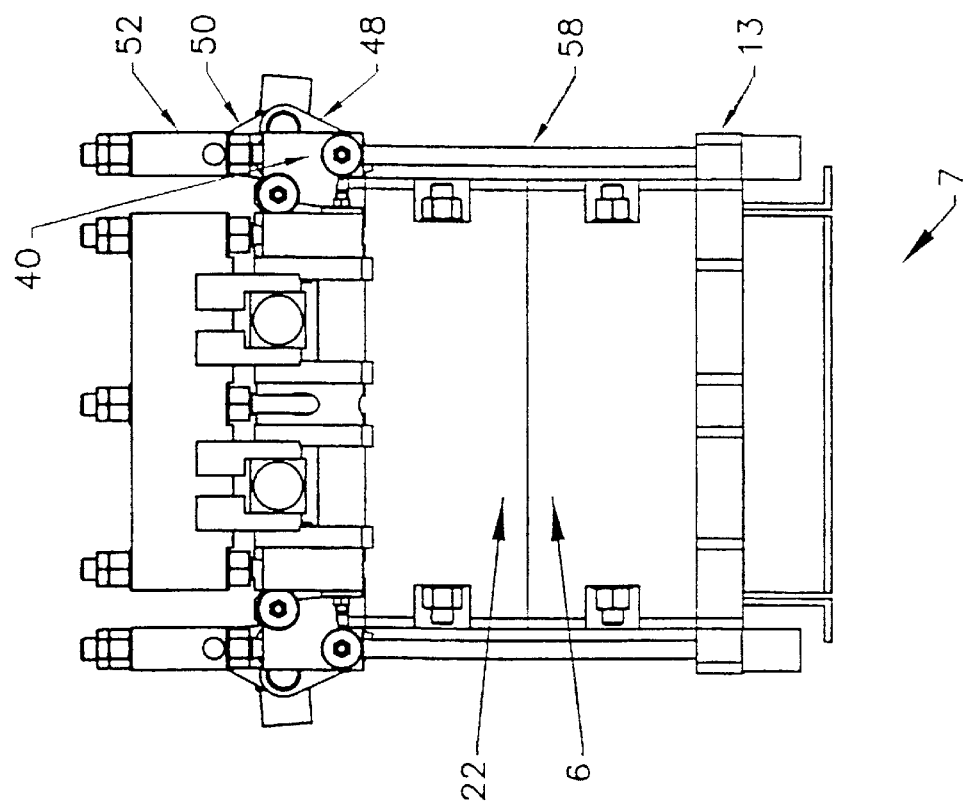

Referring to FIGS. 11 and 12, the upper part 3 is lowered until the protruding jacking pins 31 make contact with the top surface 80 of the lower manifold block 6. The hydraulic cylinder 54, which is part of an actuating mechanism for the toggle joint mechanism, is actuated so as to cause the piston rod 56 to be partially retracted. As the side edge 49 of the bottom toggle arm 48 is in engagement with the side edge 36 of the top plate 23, the partial retraction causes the end brackets 40 and the link member 47 (see FIG. 5) to be turned about the pivot pin 38 in a clockwise manner as shown is in FIG. 12. This causes the tie-bars 58, held in the holes 65 of the end brackets and the hole 66 in the link member 47, to be swung so that the foot bar 60 is swung beneath the tongues 13 of the bottom plate 8 so that the tongues protrude between the tie bars. Thus, part of the foot bar is overhung by a portion of the lower connector part 2. At the same time the upper manifold block 22, which is connected to the end brackets 40 via the top plate 23 and the pivot pin 38, is lowered relative to the jacking pins 31 the heads 32 of which maintain contact with the underside of the main body portion of the corresponding end brackets 40. The lowering action dampens the installation of the upper manifold block 22 on the lower manifold block 6. The lowering action additionally causes sea-water between the two blocks 6,22 to be flushed out, thus cleaning the respective contacting surfaces of the two blocks. Pumps may also be included to provide flushing. The upper manifold block 22 is then brought into contact with the lower manifold block 6 as shown in FIGS. 13 and 14.

The bottom protruding portion 41 of the end bracket 40 has a side edge 67 (see FIG. 5) which is brought into engagement with the side edge 36 of the top plate 23 when the upper manifold block 22 cannot be lowered any further. The hydraulic cylinder 54 continues to retract the piston rod 56 causing the side edge 49 of the bottom toggle arm 48 to disengage from the top plate side edge 36 as the latter is now engaged by the bottom protruding portion 41. This continued retraction causes the bottom toggle arm 48 to turn in an anticlockwise direction about the pivot pin 38. Hence, the hydraulic cylinder 54 with its protruding trunnion bearings 51 is brought closer to the rod end pin 45 causing the top toggle arm 50 to reduce its angle relative to the tie bars 58 as the tie bars slide within the holes 65,66 in the end brackets 40 and the link member 47. Thus, the top beam 52 is raised lifting the tie bars 58 and moving the foot bar 60 towards the base of the plate 8 below the lower manifold block 6.

Figure 16:
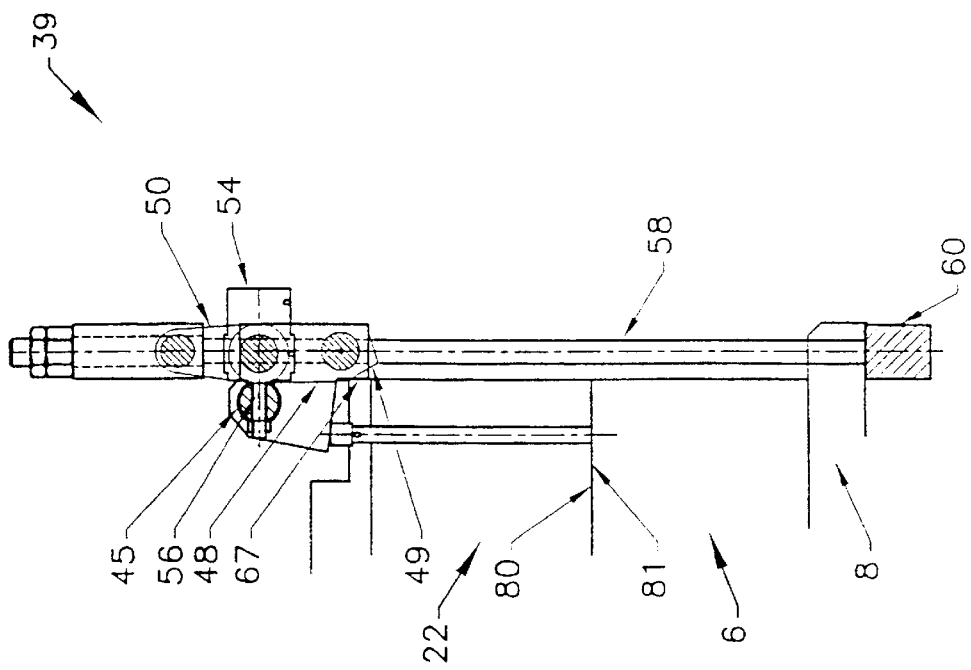
Figure 15:
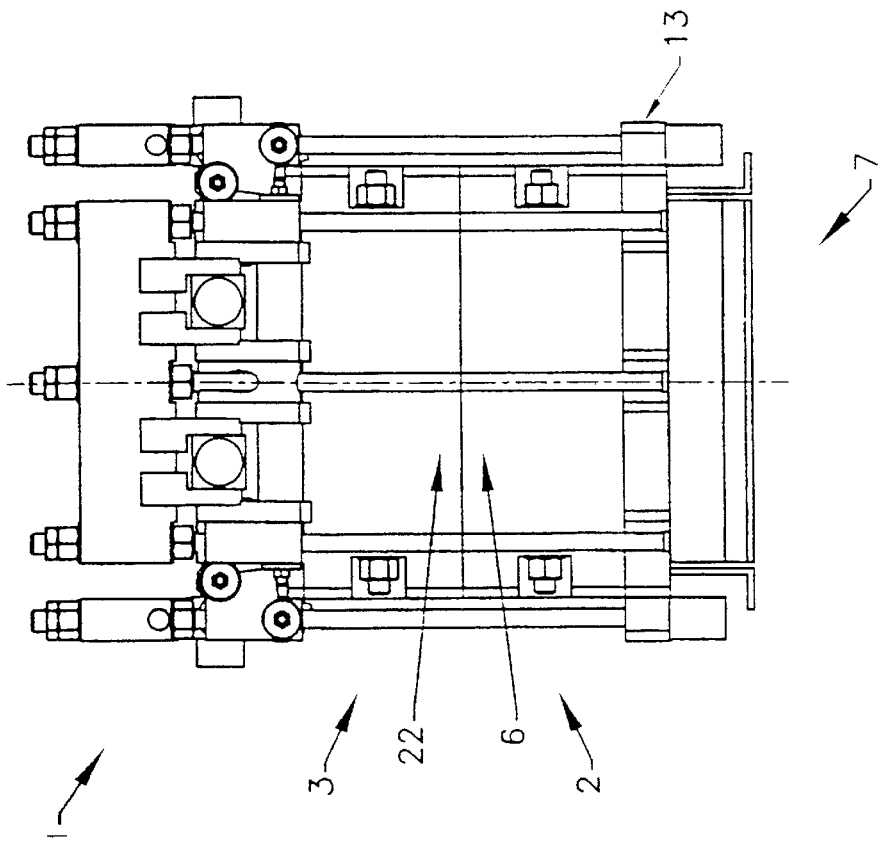

Referring to FIGS. 15 and 16, when the piston rod 56 cannot be retracted any further the hydraulic cylinder 54 is brought into contact with the rod end pin 45 with the result that both the bottom and top toggle arms 48,50 are slightly over-centered in relation to the tie arms 58 so as to lock the toggle arms 48,50 into position. This brings the foot bar 60 to be effectively at its shortest distance from the toggle joint mechanism 39 with the top of the foot bar making contact with the base of the plate 8 below the lower manifold block 6 causing the top surface 80 of the lower manifold block and the base or bottom surface 81 of the upper manifold block to mate. Hence, the two parts 2,3 of the connector 1 become clamped together to form a fluid seal between them.

The spindle valves 17 (see FIG. 2) in both the upper and the lower manifold blocks 6,22 can then be rotated so that the through-bores 18 can be aligned with the main duct to permit fluid flow through the connector 1.

To disengage the upper part 3 of the connector 1 from the lower part 2 the process is simply reversed. The valves 17 are all positioned so as to obturate the ducts 15. Pressurised liquid is forced into the hydraulic cylinder 54 causing the piston rod 56 to be extended out of the cylinder. This causes the bottom and top toggle arms 48,50 to rotate about the trunnion bearings 51 thus lowering the top beam 52. The movement of the top beam causes the top of the foot bar 60 to disengage from the base of the plate 8 below the lower manifold block 6. The continuing extension of the piston rod 56 causes the foot bar 60 to be swung out from below the lower manifold block 6 and causing the tie bars 58 to be inclined in relation to the side of the manifold blocks 6,22. This also causes the jacking pins 31 to protrude through the base of the upper manifold block 22 and push against the top of the lower manifold block 6 raising the upper manifold block. The action of the jacking pins also gently breaks the sealed connection between the vertical ducts 15 in the lower and upper manifold blocks 6,22. The upper part 3 of the connector 1 is then moved away from the lower part 2.

Figure 17:
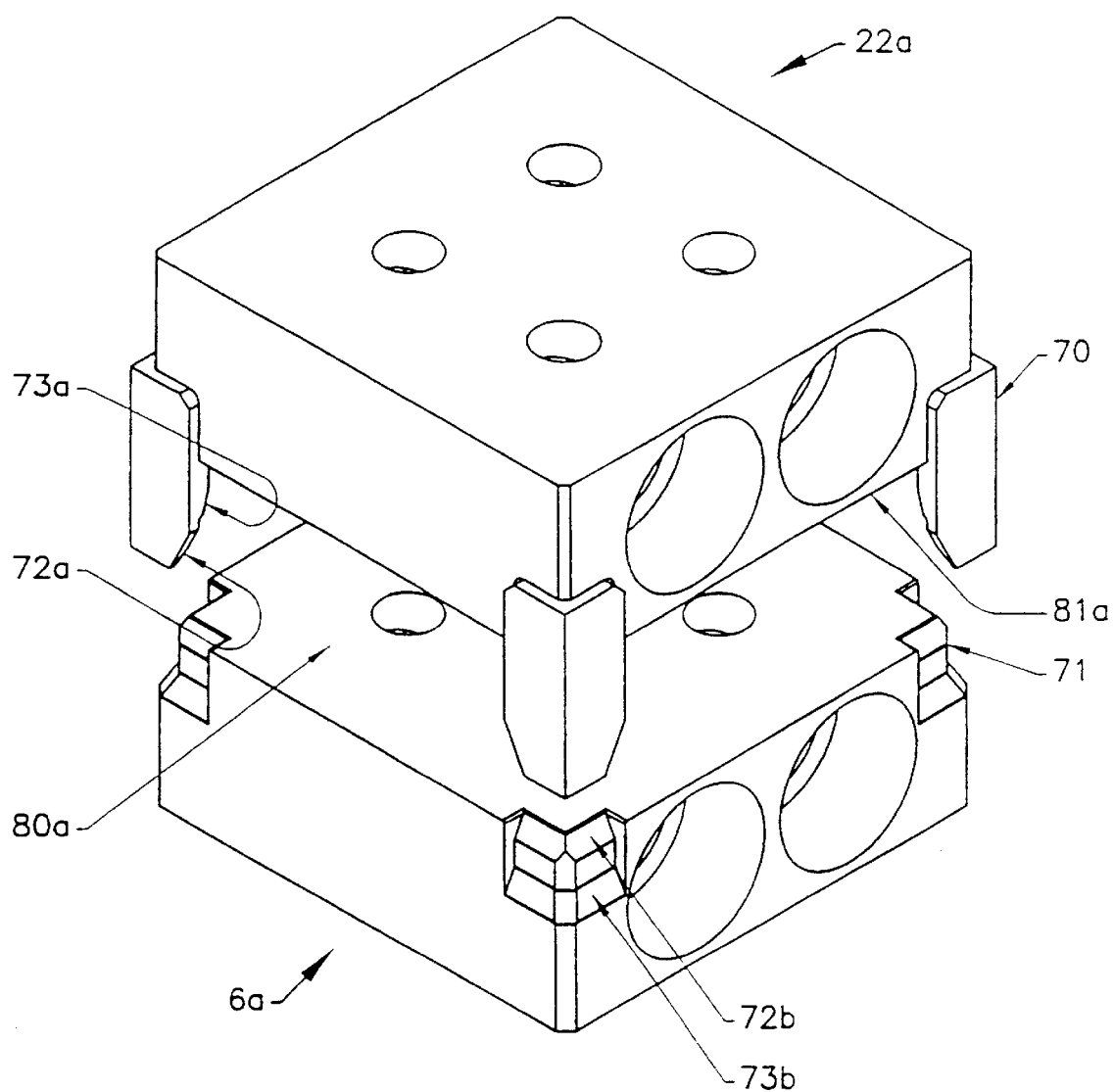
FIG. 17 is an isometric view of modified upper and lower manifold blocks forming part of the two-part connector.

In a particular modification, as shown in FIG. 17, the location pins 25 of the upper manifold block 22 and the associated bores are replaced by another type of secondary location device. The upper manifold block 22*a* has a tapered locator 70 extending downwardly below the base 81*a* from each corner and the lower manifold block 6*a* has a shaped recess 71 in each corner of the top surface 80*a* to receive a corresponding locator. Each locator 70 has a first tapered surface 72*a* on its lowest portion stepping in from a second tapered surface 73*a* above and each recess has corresponding first tapered surface 72*b* on the uppermost portion of the lower block 6 stepping in from a second tapered surface 73*b* below. Hence, when the upper manifold block is in close proximity to the lower block, the first tapered surface of at least one locator engages a corresponding recess. If the two blocks are not quite aligned then the first tapered surface 72*a* of one locator 70 engages a corresponding first tapered surface 72*b* of a recess 71 of the lower block 6*a* to bring the upper block into partial alignment with the lower block. As the upper block is lowered into closer proximity to the lower block, the first and second tapered surfaces 72*a*,73*a* of all the locators 70 engage the second and first tapered surfaces 73*b*,72*b* respectively of all the recesses thus bringing the two blocks 6*a*,22*a* into full alignment.

Whilst a particular embodiment has been described, it will be understood that various modifications may be made without departing from the scope of the invention. For example, the upper and lower parts may be brought together by any suitable means. The pedestal may be of any suitable shape.

The mating clamps may be arranged so that they do not all need to operate simultaneously, such as only a pair of mating clamps, on opposite sides of the connector, being initially operated. Although mating clamps are shown on all four sides of a square plan connector, the connector could be rectangular and only have mating clamps on the two longest sides or it could triangular and have mating clamps on all three sides. The connector could also by polygonal in plan with any suitable number of mating clamps. Each side could have any suitable number of hydraulic cylinders and with there being one more tie bar than there are hydraulic cylinders. For example, there may be a single hydraulic cylinder and two tie bars or three hydraulic cylinders and four tie bars.

Although the spindle valves are operated by ROVs they may be operated from boats or platforms above sea-level or from the shore via an umbilical and internal mechanisms may be provided to operate the valves. Also, any other suitable type of valves may be used to permit or prevent flow through the ducts.

Any suitable means may be used to locate the upper part to the lower part of the connector. The arrangement of locators and recesses may be arranged, for example, so that each part has both locators and recesses.

While hydraulic cylinders have been referred to, alternative actuating means may be employed such as pneumatic cylinders, electrically powered actuators etc.

What is claimed is:

1. A two-part connector (1) for use in connecting and disconnecting fluid carrying conduits comprising first and second connector parts (2,3) each having at least one fluid carrying duct (15) therethrough, and a valve member (17) for each duct, the at least one duct in the first connector part (2) being aligned with the at least one duct in the second connector part (3) when the two connector parts are connected together, and releasable clamping means to retain the two connector parts together in sealing engagement, said clamping means being mounted on the second connector part (3) and including actuating means (54), characterised by said clamping means including a plurality of clamping members (24) pivotable relative to the connector and the actuating means (54) operable to move said clamping members, each clamping member (24) comprising first and second components (39,60) joined together by at least one tie bar (58) the first component (39) being pivotally connected to the second connector part (3) by a pivot pin, said clamping members being located in a first position pivoted away from said connector whilst the two connector parts (2,3) are being aligned relative to each other, and said actuating means being operable to pivot said clamping members to a second position adjacent said connector and then to cause the clamping members to move substantially linearly to a third position so that the second component (60) is adapted to engage the first connector part so that the two parts are clamped together in sealing engagement.

2. A two-part connector as claimed in claim 1, wherein the first component comprises a toggle joint mechanism (39).

3. A two-part connector as claimed in claim 2, wherein each tie bar (58) is adapted to effect the clamping action by over-centering of the toggle joint mechanism (39) when the clamping members (24) are in the third position.

4. A two-part connector as claimed in claim 2, wherein the toggle joint mechanism (39) includes at least one first arm member (48) pivotally connected to the second connector part (3) and to the actuating means (54) and at least one second arm member (50) pivotally connected to the actuating means (54) and to the elongate member (58).

5. A two-part connector as claimed in claim 4, wherein the first arm member (48) includes an engagement surface (49) which engages the second connector part (3) so as to prevent pivoting of the first arm member relative to the second connector part when the damping member (24) pivots between said first and second positions and which disengages from the second connector part so as to enable pivoting of the first arm member relative to the second connector part when the clamping member moves between said second and third positions.

6. A two-part connector as claimed in claim 1, wherein the first component (39) includes engagement means (40) pivotally connected to the actuating means (54) and to the second connector part (3), the engagement means adapted to engage the second connector part to prevent pivoting of the clamping member (24) when the clamping member is moved between said second and third positions.

7. A two-part connector as claimed in claim 1, wherein the actuating means (54) is hydraulically operated.

8. A two-part connector as claimed in claim 1, wherein the actuating means comprises a plurality of pistons and cylinders (54) in which at least one piston cylinder, by extending or retracting a piston rod (56), causes at least one clamping member (24) to be moved between the first, second and third positions.

9. A two-part connector as claimed in claim 1, wherein the first and second connector parts (2,3) each have a mating surface (80,81).

10. A two-part connector as claimed in claim 9, including at least one jacking pin (31) which the actuating means (54) is adapted to act on, the actuating means enabling the at least one jacking pin to be extended or retracted through the mating surface (81) from one of said connector parts and the pins being adapted to make contact with the mating surface (80) of the other of said connector parts.

11. A two-part connector as claimed in claim 9 including alignment means (25,21,70,71) for aligning the first and second connector parts (2,3) as they engage each other.

12. A two-part connector as claimed in claim 11 wherein the alignment means includes a plurality of location pins (25), each said pin extending from the mating surface (81) from one of said connector parts and being adapted to be received in a receiving hole (21) in the mating surface (80) of the other of said connector parts.

13. A two-part connector as claimed in claim 11 wherein the alignment means includes a plurality of protusions (70), each protusion extending from a corner of the mating surface (81a) from one of said connector parts and being adapted to be received in a recessed corner (71) of the mating surface (80a) of the other of said connector parts.

14. A two-part connector as claimed in claim 13, wherein the mating surfaces (80a,81a) of the connector parts are rectangular, and at least one pair of opposite corners of the mating surfaces has said protusions (70) and recessed corners (71).

* * * * *